(12) United States Patent
Durand

(10) Patent No.: US 8,898,421 B2
(45) Date of Patent: Nov. 25, 2014

(54) ELECTRONIC DEVICE FOR PROVIDING SELF-ADAPTING SERVICES DEPENDING ON THE PLATFORM OF THE HOST EQUIPMENT WITH WHICH IT IS CONNECTED

(75) Inventor: Stephane Durand, Meudon (FR)

(73) Assignee: Gemalto SA, Meudon (FR)

( * ) Notice: Subject to any disclaimer, the term of this patent is extended or adjusted under 35 U.S.C. 154(b) by 908 days.

(21) Appl. No.: 12/995,515

(22) PCT Filed: May 26, 2009

(86) PCT No.: PCT/EP2009/056364
§ 371 (c)(1),
(2), (4) Date: Dec. 1, 2010

(87) PCT Pub. No.: WO2009/147027
PCT Pub. Date: Dec. 10, 2009

(65) Prior Publication Data
US 2011/0082986 A1 Apr. 7, 2011

(30) Foreign Application Priority Data
Jun. 2, 2008 (EP) .................................... 08290505

(51) Int. Cl.
*G06F 12/02* (2006.01)
*G06F 13/00* (2006.01)
*G06F 13/42* (2006.01)
*G06F 3/06* (2006.01)

(52) U.S. Cl.
CPC ............ *G06F 13/426* (2013.01); *G06F 3/0644* (2013.01); *G06F 12/02* (2013.01)
USPC .......................................... 711/173; 711/115

(58) Field of Classification Search
CPC ..... G06F 12/00; G06F 12/02; G06F 12/0246; G06F 3/0644; G06F 2212/1004; G06F 13/426
See application file for complete search history.

(56) References Cited

U.S. PATENT DOCUMENTS 5,636,357 A * 6/1997 Weiner .......................... 711/115
7,870,302 B2 * 1/2011 Huang et al. ...................... 710/8
(Continued)

FOREIGN PATENT DOCUMENTS

| WO | WO03/012577 A2 | 2/2003 |
| WO | WO2004/008314 A1 | 1/2004 |
| WO | WO2008/049102 A2 | 4/2008 |

OTHER PUBLICATIONS

PCT/EP2009/056364 International Search Report, Aug. 26, 2009. European Patent Office, P.B. 5818 Patentlaan 2 NL—2280 HV Rijswijk. The Whole Document.
(Continued)

*Primary Examiner* — Sanjiv Shah
*Assistant Examiner* — Glenn Gossage
(74) *Attorney, Agent, or Firm* — The Jansson Firm; Pehr B. Jansson

(57) ABSTRACT

An electronic device having one or more services made available to a host equipment with which it is connected. The device automatically adjusts the access capability to the services made available depending on the software platform available within the host equipment. The electronic device may include a platform identifier operating on data exchanged with the host equipment to identify the platform. The electronic device may be an electronic storage device providing access capability for reading/writing to memory, wherein the access capability is adapted to the host equipment. A memory may be partitioned into areas of memory dedicated to first and second types of software platforms available within the host equipment, and an area independent of the type of software platform. A memory may also be operated to list services authorized for a given platform, wherein a reference to this memory may be contained in a reserved memory.

8 Claims, 3 Drawing Sheets

(56) References Cited

U.S. PATENT DOCUMENTS

2004/0003135 A1    1/2004   Moore
2008/0005370 A1    1/2008   Bolan et al.

OTHER PUBLICATIONS

PCT/EP2009/056364 Written Opinion of the International Searching Authority, Aug. 26, 2009. European Patent Office, D-80198 Munich. The Whole Document.

* cited by examiner

ELECTRONIC DEVICE FOR PROVIDING SELF-ADAPTING SERVICES DEPENDING ON THE PLATFORM OF THE HOST EQUIPMENT WITH WHICH IT IS CONNECTED

BACKGROUND

The invention relates to an electronic device having one or more services whose availability depends on the host equipment with which it is connected. More particularly the invention relates to an electronic storage device comprising a memory to contain data and/or at least a program or software component.

Many devices exist today. The most popular ones are dongles or keys, including in general a Flash type mass memory. They usually communicate with host equipment using the USB (Universal Serial Bus) protocol. This device enables the user of a laptop for example to copy or import data. The user may also carry out the installation of software components in order to enrich the range of functions on the user's computer.

There are other devices, such as MMC (Multi-Media Card) or SD (Secure Digital) type memory cards. In addition, there are devices such as smart cards, some of which are known under the acronym UICC (Universal Integrated Circuit Card). These cards typically bear a SIM (Subscriber Identity Module) type application or more generally an application which enables identification of a subscriber and definition of the rights of its proprietor, so that the subscriber can benefit from services of any kind. Removable or portable hard drives also enable saving, sharing, and deployment of data and programs.

Other devices include a content server, such as pages (for example written in HTML—Hypertext Markup Language) available using a web browser, programs which can be downloaded on devices such as a laptop.

In addition, host platforms suitable to establish a wired connection or wireless connection are varied. Portable laptops or office computers are the most known ones. One may also name, without limitation, mobile communication terminals connecting to a network, in general of GSM/GPRS (Global System for Mobile communications/General Packet Radio Service) type, or personal electronic assistants. The list of devices capable of establishing communication with an electronic storage device could be long. Besides very heterogeneous physical structures, these devices require software platforms or different operating systems in order to manage their hardware and software resources. For example, personal computers are sold and configured with a Windows® operating system published by Microsoft Corporation. Others are sold with the operating system Linux® or the computers distributed by Apple Inc. incorporate the operating system Mac OS® etc. (Mac OS and Apple are trademarks of Apple Inc., Cupertino, California; Windows and Microsoft are trademarks of Microsoft Corporation, Redmond, Wash.; and Linux is a trademark of Linus Torvalds and administered by the Linux Mark Institute).

The management of text files or even multimedia is usually no problem. For example, it is easy to copy from a USB key photos, documents or even video or sound from a computer having a "MAC OS"® system on a second computer with a Windows® operating system. The transfer of software, programs or simple software components is more problematic. Indeed, such programs or software, in whole or in part, depend on the software platform or operating system of the host equipment.

A software application cannot work with Windows®, Linux® or Mac OS® without adaptations. In order to deploy these applications using electronic storage devices, publishers need to store as many versions of the application to be deployed as target platforms exist. In order to facilitate the action of a user wishing to install an application contained on a USB dongle, the versions of this application are distributed in the mass memory of the dongle and are accessible through directories. Each directory is then dedicated to a type of host platform: Windows®, Linux® . . . A directory contains various software components associated with a dedicated version and an operating process stored with one or more electronic documents.

After having connected a dongle to a computer, the user must then navigate with the file manager of the computer in the tree structure of the memory plan of the dongle and select the relevant directory. Unfortunately, selection errors are frequently made or detected. Poor selection makes the installation ineffective and induces a large solicitation of help from call centres of software companies. Mishandling may damage the software configuration of the host equipment and causes discontent or disappointment of the clumsy, distracted customer, customer who may not be used to dealing with this type of technical issues. The commercial impact is extremely negative in the event of wrong selection or manipulation of the user.

The invention aims to solve the disadvantages of the prior art by providing a simple and transparent solution to the user. Thus, the invention promotes the deployment of software applications and prevents any risk of mishandling and wrong selection by the user.

SUMMARY

To that purpose, an electronic device having one or more services is particularly planned. The device includes a memory having at least one service which can be used by a host equipment; means of communication enabling a connection to a host equipment; a means to manage and make available to the host equipment the service or services; and a software platform identifier to identify a software platform available within the host equipment. The device is characterized by the memory, which is partitioned into at least three areas of memory. The first area is dedicated to the first type of software platform available within the host equipment. The second area is dedicated to the second type of software platform available within the host equipment. The third area is independent of the type of software platform available within the host equipment. In addition, the means to manage the services automatically adjusts the access capability to those services from the host equipment depending on the platform identified by the identifier by presenting one of the first and second areas and the third area.

Preferably, the means to manage the services may be an access controller for reading and/or writing of the memory able to automatically select the area accessible for reading and/or writing to the memory depending on the platform of the host equipment identified by the identifier.

In a preferred embodiment the software platform identifier may be part of the means to manage the services.

To identify the platform available within the host equipment, the software platform identifier may use certain data exchanged with the host equipment, such as commands to initialize the communication.

According to a first embodiment, the means to manage the services may operate a reserved memory for the reference of the areas authorized for a given platform.

According to a variant, the means to manage the services may also operate a memory to list the services authorized for a given platform. The reference to that memory is contained in the reserved memory.

According to a second embodiment, the means for managing the services operates a memory to list the services authorized for a given platform, the contents of that memory is prepared in advance by such means from data stored in the reserved memory.

BRIEF DESCRIPTION OF THE DRAWINGS

Other features and advantages will appear more clearly when reading the following description and when reviewing the figures that accompany it, including.

DETAILED DESCRIPTION

Figure 1:
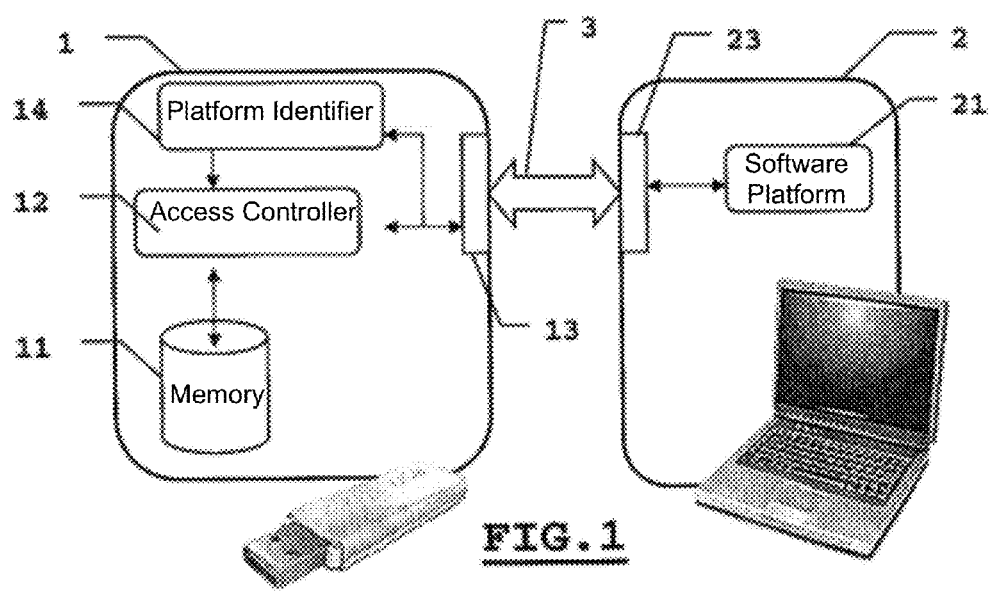
FIG. 1 shows an electronic storage device according to the invention.

FIG. 1 shows an electronic storage device 1 according to the invention. This device 1 is in conjunction with host equipment 2, respectively illustrated and by way of example, by a USB stick and a laptop.

The host equipment 2 namely has a software platform 21 and communication means 23. The software platform 21 may be the operating system Windows® published by Microsoft or Linux® or "MAC OS"® for an Apple® computer or any other operating system. The means of communication 23 enables establishment of communication 3 supporting, for example, the USB protocol or any other type of communication. The means may also provide a contactless communication, such as Bluetooth®, Wi-Fi® etc. (Bluetooth is a trademark of Bluetooth SIG, Inc. and Wi-Fi is a trademark of the Wi-Fi Alliance.).

To facilitate the readability hereof, other software and hardware (processing unit, memories . . . ) implemented by the host equipment 2 are not represented in FIG. 1.

The electronic storage device 1 has a mass memory 11 accessible by reading/writing from the host equipment 2 through an access controller 12. It also includes communication means 13 enabling establishment of communication 3 with the host equipment. For example, the means 13 provide a communication using the USB communication protocol. The means of communication 13 of device 1 could also provide a wired communication or communication without contact. To ensure communication with device 1, the host equipment 2 initiates the communication by a series of commands, especially so as to recognize the type of device 1, its software and/or hardware configuration.

In the case of communication using the USB protocol, the commands particularly consist in:

Initializing the communication bus;
Requesting a device descriptor;
Configuration of that device.

Figure 3:
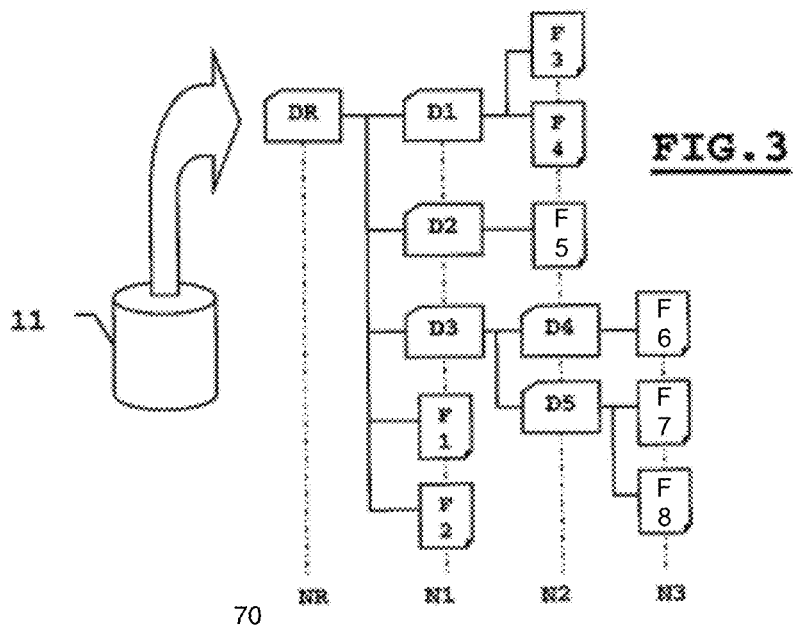
FIG. 3 shows the logical structure of a plan of the mass memory of an electronic storage device.

In the case presented in conjunction with FIG. 1, a device 1 such as a USB stick cannot interpret a logical structure of directories and files as shown in FIG. 3. The device 1 provides (via the access controller 12) services of reading and/or writing by memory blocks. The host equipment 2 only can interpret a logical memory structure as shown in FIG. 3. FIG. 3 shows an example of a tree structure of files F1 through F8 grouped by directories DR, D1-D5. The contents of a mass memory (such as memory 11 of a storage device in conjunction with FIG. 1) can be represented with a tree view at several levels of hierarchy NR, N1, N2 and N3. The main directory or root directory is DR. It lists the files F1 and F2 as well as three other directories of level N1: D1, D2 and D3. The directory D1 bundles files F3 and F4. Directory D2 contains a single file F5. The directory D3 (of the same level N1 as D1 and D2) has two directories of a lower level N2: D4 and D5. In turn directories D4 and D5 respectively bundle file F6 and files F7 and F8. By using this type of representation, the contents of a memory are traditionally organized. The data of a user of an electronic device are divided and classified.

Figure 4:
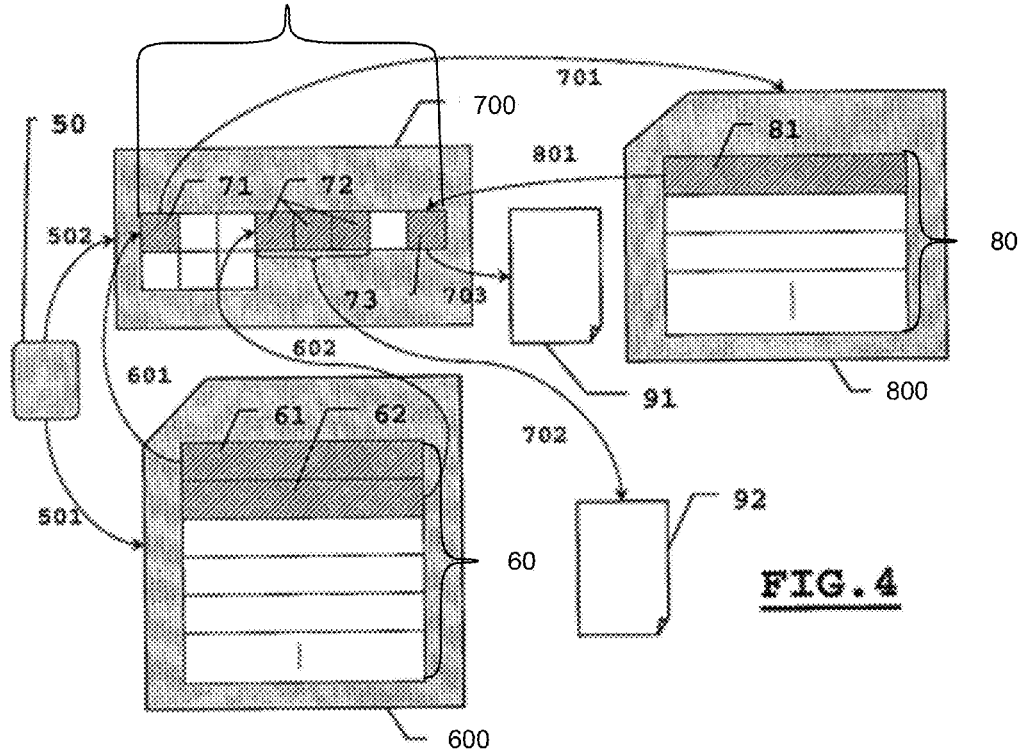
FIG. 4 shows the data structures used to manage the mass memory of an electronic storage device.

FIG. 4 is an illustration describing an embodiment constituting a data structure of a memory 11 described in conjunction with the logical structure of FIG. 3. The embodiment is a FAT (File Allocation Table) file system. This type of system can be considered universal. Indeed, the operating systems being developed such as Windows®, Linux® recognize this file system.

According to this system, memory 11 includes traditionally four areas: the reserved area 50, area 700 dedicated to a file allocation table an area 600 dedicated to the root directory 60 and an area 800 for files and directories. The reserved area 50 includes the address 501 particularly of the root directory DR. This address is directly or indirectly encoded. Indeed, the reserved area may alternatively contain the size of area 700 immediately following the reserved area 50. The root directory being the memory structure immediately following table 70, it is possible to deduce indirectly the address of the root directory 60. Address 502 of the area of table 70 can also be deducted indirectly. This is particularly the case if memory area 700 immediately follows the reserved area 50. If these memory areas are not adjacent, address 502 may be explicitly written in the reserved area 50.

Table 70 is used to configure the memory space used for files and directories. There is an entry 71, 72, 73 for each basic unit or cluster of the file memory. An entry may contain a value to indicate:

That the cluster is not used;
That the cluster is reserved;
That the cluster is damaged;
That the cluster is the last cluster of a file;
The cluster following a file.

Thus when a file F1 through F8 is created, the software platform 21 allocates clusters to create the file by searching unused clusters in table 70. The platform updates that table 70 to associate clusters or entries 72 and 73 with file 92 and 91, respectively (the association illustrated by 702 and 703, respectively).

The root directory 60 is used as a table of contents. It identifies files and directories of level N1. Each entry 61 and 62 includes the name of the file or directory of level N1, its size and location in the memory. For this, an entry 61 or 62 of the root directory includes the address or number of the first entry in table 70 associated with the file or directory. Entry 61 can specify (illustrated by 601), the first entry 71 in table 70. The directories of level N1 and N2 each have a structure similar to the root directory. The structure of a directory 80 is stored in the memory area 800 of files and directories. Entry 71 in the allocation table 70 is then associated (illustrated as 701) to a directory. In turn, directory 80 includes one or more entries 81 each associated (illustrated as 801) to a file 91 or directory of lower level.

According to the prior art, data can be classified as:
- Data specific to the Windows® platform under the directory D1;
- Data specific to the Linux® platform under the directory D2;
- Common data under the directory D3.

However such a division cannot overcome a wrong selection by the user. Although the name of directory D1 (or a help file F1) describes the procedure to install an application compatible with a Windows® platform, the user may inadvertently choose to install a program (stored in D2) compatible with Linux®. The installation will be ineffective and the user unsatisfied.

The invention solves the disadvantages of previous solutions by hiding to platform 21 (i.e., to the user) the directories containing incompatible applications or irrelevant data. In order to do this, data and applications are classified as seen according to the prior art:
- Data specific to the Windows® platform under the directory D1;
- Data specific to the Linux® platform under the directory D2;
- Common data under the directory D3.

Device 1 according to the invention also includes the mass memory 11, an access controller 12 to control access to memory 11, and a platform identifier 14 to identify a software platform 21 available within the host equipment 2.

To identify platform 21, the platform identifier 14 can analyze the series of commands sent from the host equipment 2 when setting the connection of device 1 and host equipment 2.

If we take the example of the USB protocol to illustrate the identification stage, we saw that the commands consist in:
- Initializing the communication bus;
- Requesting a device descriptor;
- Configuring that device . . .

In the case where the software platform 21 is a Windows® platform these commands are translated (in English) by the program instructions:
1) Bus Reset (noted "R");
2) Get Device Descriptor (noted "D");
3) Bus Reset (noted "R");
4) Get Device Descriptor (noted "D");
5) Set Address (noted "A")
6) Set Configuration (noted "C")
7) . . .

We can schematically note "RDRDAC" to characterize this sequence of instructions In the case where the software platform 21 is a Linux® platform only the following instructions are transmitted:
1) Bus Reset (noted "R");
2) Get Device Descriptor (noted "D");
3) Set Address (noted "A")
4) Set Configuration (noted "C")
5) . . .

The sequence may also be noted "RDAC"

We could take other examples (Mac OS®, etc.) to illustrate the fact that the sequence of instructions allowing initializing the communication is a kind of signature of the software platform 21, a signature that the platform identifier 14 of the device 1 can exploit according to the invention.

Alternatively, the identification made by the platform identifier 14 may be more complex and require a more complete analysis of these commands. A state machine may for example be implemented by the platform identifier 14 to perform the function of identification. Other mechanisms could be imagined using other features from the host equipment 2.

To solve the drawbacks of known solutions, device 1 according to the invention includes an access controller 12 to memory 11, modified to automatically adjust access capability (shown as 11a in FIG. 2, hereinafter access capability 11a) in reading and/or writing to the memory 11 from the host equipment depending on the platform identified by the platform identifier 14.

Figure 2:
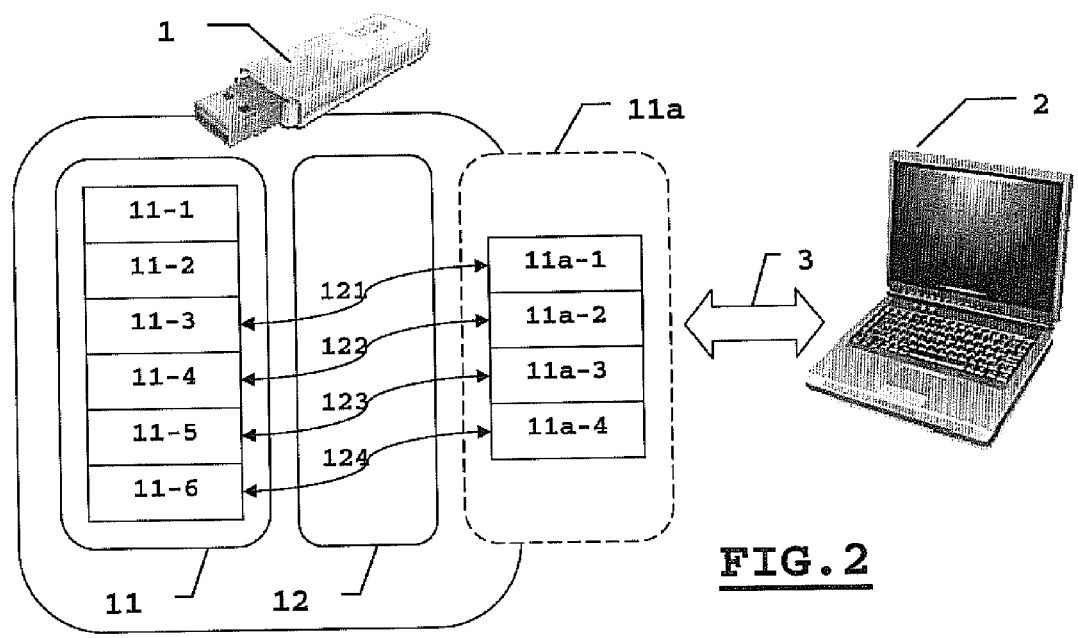
FIG. 2 shows the adaptation of access capability to the mass memory of a storage device according to the invention.

FIG. 2 shows a device 1 the memory 11 of which includes:
- Part 11-1 of the allocation table 70 that is dedicated to relevant data only for a Windows® platform, and the corresponding Windows® data 11-2;
- Part 11-3 of the allocation table 70 that is dedicated to relevant data only for a Linux® OS platform, and the corresponding Linux® data 11-4;
- Part 11-5 of the allocation table 70 that is dedicated to common data for both platforms, and the corresponding common data 11-6.

The device 1 according to the invention presents to a host equipment 2—a laptop computer equipped with a Linux® OS platform 21—a reduced and dedicated access capability 11a. For this host equipment 2 are available only:
- 11a-1 and 11a-2, respectively corresponding to part 11-3 of the allocation table 70 dedicated to relevant data only for a Linux® OS platform 21, and to the corresponding Linux® data 11-4;
- 11a-3 and 11a-4, respectively corresponding to the part 11-5 of the allocation table 70 dedicated to common data for both platforms, and the corresponding common data 11-6.

In order to present the only relevant evidence to a platform, a first embodiment consists in providing in the memory area 600 dedicated to the root directory 60 (see FIG. 4) as many structures or entries 61, 62 as platforms that may be linked to the electronic storage device. Thus, for an electronic device comprising data and/or programs specific to two platforms (Windows®, and Linux® OS for example), it is provided in memory area 600:

1) A root directory including:
   a. an entry dedicated to a directory D1 containing relevant data and/or programs solely for a Windows® platform;
   b. an entry dedicated to a directory D3 containing common data to any platform;
   c. possibly one or more entry(s) dedicated to one or more help or promotion files in order to install programmes specific to a host equipment equipped with a Windows® platform;

2) A root directory including:
   a. an entry dedicated to a directory D2 containing relevant data and/or programmes solely for a Linux® OS platform;
   b. an entry dedicated to a directory D3 containing common data of any platform;
   c. possibly one or more entry(s) dedicated to one or more help or promotion files in order to install programs specific to a host equipment equipped with a Linux® OS platform.

In the reserved area 50 there is also provided an association to an entry point or specific address for each of the root directories of memory area 600.

Thus, after the identification phase performed by the platform identifier 14, the access controller 12 uses the access point or address relative to the relevant root directory under the identified platform 21. The data and/or programs specific to another platform are inaccessible.

According to another embodiment, the different versions of root directories are stored in the reserved memory. For this embodiment, each structure includes a separate identifier. The access controller 12 copies in memory area 600 the relevant structure depending on the identified platform.

Alternatively, only a full version of the root directory is stored in the reserved area 50. The root directory structure in memory area 600 is generated at the time of connection, via the access controller 12 as a result of the identification stage of the platform. In order to do this, a distinctive identifier contained in each entry 61, 62 of the root directory is stored in the reserved area 50 and only the entries relevant to the identified platform are copied. The entries correspond to data specific to the platform and common data.

Other embodiments could be imagined. The above described achievements are not exhaustive in terms of the invention.

Thus, taking as an example an electronic device according to the invention including a content server, this device could include:
- a USB type means of communication 13;
- a backing storage (acting as memory 11) (containing data from the server), and a functional means 12 (taking the role of the access controller 12 in the discussion hereinabove) implementing the content server (e.g., completed by an FTP (File Transfer Protocol) server and a "streaming" server for the transmission of the contents).

The platform identifier 14 having detected a software platform, signals to the server or functional means 12, which, for the same request from equipment 2, returns different data according to the identified platform 21. The server makes available an executable program to be downloaded and executed on the host equipment, a help "Web" page for the installation of the software, and a "Web" page describing the software license.

The program or programs made available depend(s) on platform 21. In order to implement the invention, the functional means uses for example a table or reserved area 50 of references to resources dedicated to the involved platforms. To detect platform 21, the platform identifier 14 operates the request issued by the browser of the equipment 2 in order to identify platform 21 of the host equipment 2.

Another example of implementation of the invention relates to a SIM card (acting as storage device 1), with a USB support for communications means 13, which can be used in a phone or computer via a USB connection. The operator who distributes such a card may restrict the use of certain applications contained in the card to the world of telephone and others to the computer world.

SIM Card (acting as storage device 1) comprises a platform identifier 14 to detect platform 21 of the host equipment 2 (computer or telephone).

Other examples of implementation or use of the invention could be imagined or considered.

In addition, as illustrated in and described in conjunction with FIG. 1, the platform identifier 14 and the access controller 12 (or other functional means) may be separated. In a preferred embodiment, the platform identifier 14 is part of the access controller 12 to memory 11 of a USB drive or of a server or functional means 12 of a device comprising a content server accessible via a browser.

The invention claimed is:

1. An electronic device (1) of mass memory type presenting available service applications based on a software platform of a host equipment (2) wherein at least one service application is made available to the host equipment (2) for access from the electronic device (1), the electronic device comprising:
    a memory (11) storing the at least one service application which can be used by the host equipment (2);
    a communication means (13) allowing a connection to the host equipment (2);
    an access controller (12) to manage and make available to the host equipment (2) the at least one service application;
    a software platform identifier (14) to identify a software platform (21) available within the host equipment (2);
    wherein:
    the memory (11) is partitioned into at least three areas of memory, a first area (11-1 and 11-2) being dedicated to a first type of software platform (21) available within the host equipment (2), a second area (11-3 and 11-4) being devoted to a second type of software platform (21) available within the host equipment (2), and a third area (11-5 and 11-6) being independent of the type of software platform (21) available within the host equipment (2);
    and wherein the access controller (12) automatically adjusts an access capability (11a) to service applications provided to the host equipment, depending on the platform identified by the software platform identifier (14) by presenting only one of the first and second areas of the memory and the third area of the memory to the host equipment depending on whether the platform identified is the first type of software platform or the second type of software platform.

2. The electronic device according to claim 1, wherein the access controller (12) controls reading and/or writing in the memory (11) and automatically selects an accessible area for reading and/or writing in the memory (11) depending on the platform of the host equipment identified by the software platform identifier (14).

3. The electronic device according to claim 1, wherein the software platform identifier (14) is a part of the access controller (12).

4. The electronic device according to claim 1, wherein the software platform identifier (14) operates on data (104) exchanged with the host equipment (2) in order to identify the software platform (21) of the host equipment.

5. The electronic device according to claim 4, wherein the data (104) exchanged with the host equipment (2) are based on initialization commands that initialize communication between the electronic device (1) and the host equipment (2).

6. The electronic device according to claim 1, wherein the access controller (12) also operates reserved memory (50) in order to reference the areas permitted for a given platform (21).

7. The electronic device according to claim 6, wherein the access controller (12) also operates an additional memory (60) in order to list service applications authorized for a given platform (21) and wherein a reference (501) to the additional memory (60) is contained in the reserved memory (50).

8. The electronic device according to claim 6, wherein the access controller (12) also operates an additional memory (60) in order to list service applications authorized for a given platform (21) and wherein contents of the additional memory (60) is developed by the access controller (12) from data stored in the reserved memory (50).

* * * * *